US011625642B2

(12) United States Patent
Kotorov et al.

(10) Patent No.: US 11,625,642 B2
(45) Date of Patent: Apr. 11, 2023

(54) METHOD FOR CONVERTING NOMINAL TO ORDINAL OR CONTINUOUS VARIABLES USING TIME-SERIES DISTANCES

(71) Applicant: Trendalyze Inc., Newark, NJ (US)

(72) Inventors: Radoslav P Kotorov, Somerset,, NJ (US); Dave Watson, Essex (GB)

(73) Assignee: TRENDALYZE INC., Newark, NY (US)

( * ) Notice: Subject to any disclaimer, the term of this patent is extended or adjusted under 35 U.S.C. 154(b) by 1100 days.

(21) Appl. No.: 16/269,667

(22) Filed: Feb. 7, 2019

(65) Prior Publication Data

US 2019/0325339 A1 Oct. 24, 2019

Related U.S. Application Data

(60) Provisional application No. 62/661,032, filed on Apr. 22, 2018.

(51) Int. Cl.
*G06F 16/242* (2019.01)
*G06F 16/2458* (2019.01)
*G06F 16/9032* (2019.01)
*G06N 5/02* (2023.01)
*G06N 20/00* (2019.01)
*G06F 18/22* (2023.01)

(52) U.S. Cl.
CPC ........... *G06N 20/00* (2019.01); *G06F 16/242* (2019.01); *G06F 16/2477* (2019.01); *G06F 16/90332* (2019.01); *G06F 18/22* (2023.01); *G06N 5/02* (2013.01)

(58) Field of Classification Search
CPC ........ G06N 20/00; G06N 5/02; G06F 16/242; G06F 16/2477; G06F 16/90332; G06F 18/22; G06K 9/6215
See application file for complete search history.

(56) References Cited

U.S. PATENT DOCUMENTS

| 7,761,238 | B2 | 7/2010 | Moser |
| 8,902,086 | B1 | 12/2014 | Lyman et al. |
| 9,269,049 | B2 * | 2/2016 | McCann ................ G06N 5/048 |
| 9,646,262 | B2 * | 5/2017 | Phillipps ................ G06N 20/10 |
| 10,019,486 | B2 | 7/2018 | Kephart et al. |
| 11,343,268 | B2 * | 5/2022 | Apostolopoulos .......................... G06F 16/9024 |
| 2008/0071843 | A1 * | 3/2008 | Papadimitriou ...... G06F 16/283 |

(Continued)

FOREIGN PATENT DOCUMENTS

EP  2748929 B1  7/2014

*Primary Examiner* — Jorge A Casanova

(57) ABSTRACT

A method and system for converting non-ordered categorical data stored within a column in a data set into an ordered or continuous data stored in a new column within the data set. Each distinct categorical value in the nominal data column is represented by a corresponding distinct numerical value in the new column. The new representative numerical values are derived by constructing separate time series for each distinct value in the nominal data column and by calculating the similarities between the shapes of the time series. The proximity of the time series is captured in a numeric distance score. Each distinct distance score corresponds to a distinct value in the nominal data column and is a valid representation of that value in machine learning, deep learning, and statistical analysis.

15 Claims, 11 Drawing Sheets

(56) References Cited

U.S. PATENT DOCUMENTS

| | | | |
|---|---|---|---|
| 2017/0316007 A1* | 11/2017 | Vandenberg | G06F 16/24534 |
| 2018/0046926 A1 | 2/2018 | Achin et al. | |
| 2018/0225391 A1* | 8/2018 | Sali | G06N 20/20 |
| 2020/0285899 A1* | 9/2020 | Chen | G06N 20/00 |

* cited by examiner

200a 203  201  202

| Date | Category | Sales | Qty |
|---|---|---|---|
| 1/1/2018 | Cats | $ 2,300 | 100 |
| 1/2/2018 | Cats | $ 1,800 | 98 |
| 1/3/2018 | Cats | $ 1,654 | 76 |
| 1/4/2018 | Cats | $ 2,134 | 89 |
| 1/5/2018 | Cats | $ 2,698 | 120 |
| 1/6/2018 | Cats | $ 1,564 | 178 |
| 1/7/2018 | Cats | $ 2,387 | 143 |
| 1/8/2018 | Cats | $ 2,987 | 195 |
| 1/9/2018 | Cats | $ 2,190 | 110 |
| 1/10/2018 | Cats | $ 1,200 | 50 |
| 1/11/2018 | Cats | $ 1,654 | 72 |
| 1/12/2018 | Cats | $ 1,890 | 88 |
| 1/12/2018 | Cats | $ 2,095 | 105 |
| 1/13/2018 | Cats | $ 2,209 | 117 |
| 1/14/2018 | Cats | $ 1,903 | 92 |
| 1/15/2018 | Cats | $ 1,778 | 67 |
| 1/1/2018 | Dogs | $ 3,456 | 154 |
| 1/2/2018 | Dogs | $ 3,905 | 167 |
| 1/3/2018 | Dogs | $ 3,103 | 120 |
| 1/4/2018 | Dogs | $ 2,786 | 90 |
| 1/5/2018 | Dogs | $ 2,907 | 95 |
| 1/6/2018 | Dogs | $ 2,446 | 120 |
| 1/7/2018 | Dogs | $ 2,098 | 79 |
| 1/8/2018 | Dogs | $ 2,550 | 110 |
| 1/9/2018 | Dogs | $ 2,540 | 134 |
| 1/10/2018 | Dogs | $ 3,120 | 176 |
| 1/11/2018 | Dogs | $ 3,451 | 180 |
| 1/12/2018 | Dogs | $ 3,217 | 165 |
| 1/12/2018 | Dogs | $ 3,390 | 179 |
| 1/13/2018 | Dogs | $ 3,821 | 182 |
| 1/14/2018 | Dogs | $ 2,965 | 143 |
| 1/15/2018 | Dogs | $ 2,348 | 128 |
| 1/1/2018 | Fish | $ 1,125 | 210 |
| 1/2/2018 | Fish | $ 990 | 190 |
| 1/3/2018 | Fish | $ 1,390 | 245 |
| 1/4/2018 | Fish | $ 1,056 | 230 |
| 1/5/2018 | Fish | $ 880 | 167 |
| 1/6/2018 | Fish | $ 954 | 189 |
| 1/7/2018 | Fish | $ 1,250 | 199 |
| 1/8/2018 | Fish | $ 1,210 | 192 |
| 1/9/2018 | Fish | $ 1,001 | 154 |
| 1/10/2018 | Fish | $ 750 | 134 |
| 1/11/2018 | Fish | $ 790 | 149 |
| 1/12/2018 | Fish | $ 890 | 165 |
| 1/12/2018 | Fish | $ 965 | 178 |
| 1/13/2018 | Fish | $ 910 | 170 |
| 1/14/2018 | Fish | $ 1,080 | 206 |
| 1/15/2018 | Fish | $ 899 | 148 |

FIG. 2A

| Data Type | Date | Number | Nominal | Numeric | |
|---|---|---|---|---|---|
| Column Name | Date | Sequence | Category | Sales | Qty |
| | 1/1/2018 | 1 | Cats | $ 2,300 | 100 |
| | 1/2/2018 | 2 | Cats | $ 1,800 | 98 |
| | 1/3/2018 | 3 | Cats | $ 1,654 | 76 |
| | 1/4/2018 | 4 | Cats | $ 2,134 | 89 |
| | 1/5/2018 | 5 | Cats | $ 2,698 | 120 |
| | 1/6/2018 | 6 | Cats | $ 1,564 | 178 |
| | 1/7/2018 | 7 | Cats | $ 2,387 | 143 |
| | 1/8/2018 | 8 | Cats | $ 2,987 | 195 |
| | 1/9/2018 | 9 | Cats | $ 2,190 | 110 |
| | 1/10/2018 | 10 | Cats | $ 1,200 | 50 |
| | 1/11/2018 | 11 | Cats | $ 1,654 | 72 |
| | 1/12/2018 | 12 | Cats | $ 1,890 | 88 |
| | 1/12/2018 | 13 | Cats | $ 2,095 | 105 |
| | 1/13/2018 | 14 | Cats | $ 2,209 | 117 |
| | 1/14/2018 | 15 | Cats | $ 1,903 | 92 |
| | 1/15/2018 | 16 | Cats | $ 1,778 | 67 |
| | 1/1/2018 | 1 | Dogs | $ 3,456 | 154 |
| | 1/2/2018 | 2 | Dogs | $ 3,905 | 167 |
| | 1/3/2018 | 3 | Dogs | $ 3,103 | 120 |
| | 1/4/2018 | 4 | Dogs | $ 2,786 | 90 |
| | 1/5/2018 | 5 | Dogs | $ 2,907 | 95 |
| | 1/6/2018 | 6 | Dogs | $ 2,446 | 120 |
| | 1/7/2018 | 7 | Dogs | $ 2,098 | 79 |
| | 1/8/2018 | 8 | Dogs | $ 2,550 | 110 |
| | 1/9/2018 | 9 | Dogs | $ 2,540 | 134 |
| | 1/10/2018 | 10 | Dogs | $ 3,120 | 176 |
| | 1/11/2018 | 11 | Dogs | $ 3,451 | 180 |
| | 1/12/2018 | 12 | Dogs | $ 3,217 | 165 |
| | 1/12/2018 | 13 | Dogs | $ 3,390 | 179 |
| | 1/13/2018 | 14 | Dogs | $ 3,821 | 182 |
| | 1/14/2018 | 15 | Dogs | $ 2,965 | 143 |
| | 1/15/2018 | 16 | Dogs | $ 2,348 | 128 |
| | 1/1/2018 | 1 | Fish | $ 1,125 | 210 |
| | 1/2/2018 | 2 | Fish | $ 990 | 190 |
| | 1/3/2018 | 3 | Fish | $ 1,390 | 245 |
| | 1/4/2018 | 4 | Fish | $ 1,056 | 230 |
| | 1/5/2018 | 5 | Fish | $ 880 | 167 |
| | 1/6/2018 | 6 | Fish | $ 954 | 189 |
| | 1/7/2018 | 7 | Fish | $ 1,250 | 199 |
| | 1/8/2018 | 8 | Fish | $ 1,210 | 192 |
| | 1/9/2018 | 9 | Fish | $ 1,001 | 154 |
| | 1/10/2018 | 10 | Fish | $ 750 | 134 |
| | 1/11/2018 | 11 | Fish | $ 790 | 149 |
| | 1/12/2018 | 12 | Fish | $ 890 | 165 |
| | 1/12/2018 | 13 | Fish | $ 965 | 178 |
| | 1/13/2018 | 14 | Fish | $ 910 | 170 |
| | 1/14/2018 | 15 | Fish | $ 1,080 | 206 |
| | 1/15/2018 | 16 | Fish | $ 899 | 148 |

FIG. 2B

METHOD FOR CONVERTING NOMINAL TO ORDINAL OR CONTINUOUS VARIABLES USING TIME-SERIES DISTANCES

CROSS-REFERENCE TO RELATED APPLICATION

This application claims priority and benefit under 35 U.S.C. 119(e) of U.S. Provisional Patent Application No. 62/661,032, titled "A method for converting nominal to ordinal or continuous variables using time-series distances" and filed on Apr. 22, 2018, which is hereby incorporated by reference to the maximum extent permitted by applicable by law.

FIELD OF THE INVENTION

The present invention relates to methods of processing and encoding data for statistical, machine learning and deep learning analysis.

BACKGROUND OF THE INVENTION

In many cases computer software programs cannot perform statistical, machine learning and deep learning analysis and processing on categorical data. Categorical data comprises of sequences of characters or numbers, and the values cannot be ordered in a way that the distances between the values matter. For example, city and country names, brand names, product categories, product colors, etc. are typically recorded in database tables as strings of characters. Retail stores may be stored and identified in databases either as strings of characters, i.e. names of stores or as sequences of numbers, i.e. store codes. Retail products are typically stored and identified by SKUs (stock keeping unit) which are sequences of numbers. Because, the sequences of numbers cannot be ordered, these numeric variables are processed and analyzed as nominal categorical variables.

If a retail store has 100 SKUs labeled from 1 to 100, why can't they be treated as an ordered set of numbers from 1 to 100, i.e. as a continuous numeric variable? When an analytical software processes numbers the distance between them matters and will affect the conclusions from the analysis. If item 1 is Florida oranges and item 100 is California oranges, the program will conclude that the California oranges are in some aspects 99 times better or worse than the Florida oranges because the distance between the two items is 99 units. But this will be a false conclusion because the 99 units distance is arbitrary. The California oranges could have been stored in the system as item 2, thus, making the distance just one unit.

To prevent such biases in the estimation of the differences between the values in categorical variables an encoding is applied. The most common encoding approach is to create dummy variables. One example of dummy coding is when there is a control or comparison group in mind. One is therefore analyzing the data of one group in relation to the comparison group: a represents the mean of the control group and b is the difference between the mean of the experimental group and the mean of the control group. In dummy coding, the reference group is assigned a value of 0 for each code variable, the group of interest for comparison to the reference group is assigned a value of 1 for its specified code variable, while all other groups are assigned 0 for that particular code variable. For each distinct value in the categorical variable one new dummy variable is being created. Each dummy variable is a separate column in the data set. The new dummy variable (column) contains only two values 0 and 1, where 1 represents the presence of the distinct value in each row in the data set and 0 represents its absence. If there are 100 SKUs, 100 new dummy variables (columns) will be created. If the data set contains daily sales for 365 days for all 100 SKUs, the table will have 36,500 rows of data. The dummy variable for the Florida oranges will have a maximum of 365 1's for each day when Florida oranges were sold and 0's in the rest of the rows.

Today most data is highly dimensional having many categorical variables containing large number of distinct values. Many retailers have more than 1000 stores, 1000's of SKUs, customers and promotion categories, and many more. Thus, the number of dummy variables becomes quickly very large. As a result, it takes more time and more computing power to be able to process such highly dimensional data sets and harder to achieve high accuracy. It also makes it very costly to implement predictive analytics, machine learning and deep learning for big data.

There are many well-known and documented encoding methods for categorical data, such as Ordinal, One-Hot, Binary, Helmert Contrast, Sum Contrast, Hashing, BaseN, LeaveOneOut, Target Encoding, etc. Ordinal encoding is what was used in our Oranges example. It creates a single column, but the distances between the sequential numbers bias the prediction of the model. One-Hot is the classical example of dummy variables where one column per category, with a 1 or 0 in each cell if the row contained that column's category. In binary encoding, first the categories are encoded as ordinal, then those integers are converted into binary code, then the digits from that binary string are split into separate columns. This encodes the data in fewer dimensions that one-hot, but with some distortion of the distances. Sum encoding compares the mean of the dependent variable for a given level to the overall mean of the dependent variable over all the levels. That is, it uses contrasts between each of the first k-1 levels and level k In this example, level 1 is compared to all the others, level 2 to all the others, and level 3 to all the others. In polynomial encoding the coefficients taken on by polynomial coding for k=4 levels are the linear, quadratic, and cubic trends in the categorical variable. The categorical variable here is assumed to be represented by an underlying, equally spaced numeric variable. Therefore, this type of encoding is used only for ordered categorical variables with equal spacing. In backward difference encoding the mean of the dependent variable for a level is compared with the mean of the dependent variable for the prior level. This type of coding may be useful for a nominal or an ordinal variable. In helmert encoding the mean of the dependent variable for a level is compared to the mean of the dependent variable over all previous levels. Hence, the name 'reverse' being sometimes applied to differentiate from forward Helmert coding. As it can be seen each encoding method has some disadvantages with respect to processing and accuracy of the models. All of these methods are widely discussed on public websites. U.S. Pat. No. 7,761,238 for "Method and apparatus for discovering patterns in binary or categorical data" discusses encoding of categorical data to facilitate pattern discovery in data. U.S. Pat. No. 10,019,486 for "Computerized system for analyzing operational event data" discusses the benefits of categorical data encoding for improving performance. U.S. Pat. No. 8,902,086 for "Data encoding for analysis acceleration" discusses the benefits of binary data encoding into a string for accelerating the processing of the data in analytic software systems but the method is similar to One-Hot and Dummy Variable encoding and suffers from the same defects with respect to accuracy.

The present invention eliminates the drawbacks in the prior art by deriving a continuous variable from the data that corresponds and represents accurately the values in the categorical variable. The values in the new variable can be ordered and processed as regular numeric variables. The present invention ensures that the estimated distances between the values in the categorical variable are factual and thus, affect the conclusion in a meaningful way. The present method and system achieves this by constructing separate time series for each distinct value in the categorical variable and some associate measure. For example, 100 time-series are constructed representing the daily sales of each of the 100 SKUs. The shapes of the time series are compared and a proximity score is recorded for each SKU time series. The proximity score indicates how close or far apart are the sales curves of the different products/SKUs. The present method of substituting categorical variables with proximity based continuous variables allows to reduce the number of variables for analysis, to speed up the processing and increase the accuracy of the results.

SUMMARY OF THE INVENTION

This summary is not an extensive overview, and it is not intended to identify key/critical elements or delineate the scope thereof. Its sole purpose is to present some concepts in a simplified form as a prelude to more detailed description that is presented late.

The main objective of the present invention is to overcome the limitations of the prior arts by encoding and processing of nominal data as continuous data for statistical analysis, machine learning or deep learning.

The present invention is a method and system that provides means for ingesting and storing data sets and data streams in a file-based storage structure and for creating of a unifying virtual logical metadata structure for each data set. The virtual metadata structure identifies and classifies fields/columns in the data set into different types of variables such as categorical variables, measure variables, and time dimensions. The metadata structure allows to perform various operations on the variables such as transform, normalize, encode and modify the data type of any of the variables. The variables are then mapped to features and labels that become inputs into statistical analysis, machine learning, and deep learning algorithms to generate predictions.

In one embodiment, the method and system provides a GUI and an API for users to select the categorical variables for distance encoding. For example, the user may want to apply distance encoding to retail stores codes that are stored as a categorical variable. The user can select as many categorical variables as needed and apply distance encoding. If more than one variable is selected, the user can set the parameters for the encoding of each variable separately.

In another embodiment, the method and system provides means for the user to specify the parameters for the construction and computation of the distance score. The user has to specify the dimension or a combination of dimensions for which the time series will be constructed and the distance scores will be calculated. For example, when the user selects the "retail store" dimensions, time series will be constructed for each distinct store in the dimension. Then the user has to specify the measure based on which the time series will be constructed, such as "sales" or "quantity sold" for example. The user has to select a time dimension and a range filter if it is desired to limit the scope of the time period comparisons. The user has to configure the method of estimating the distances score, i.e. the type of algorithm to be used to compute proximity of time series shapes. Finally, the user can configure the reference time series, i.e. the time series to which all other time series will be compared. This ensures that the distance scores can be ranked in a meaningful way. There are various ways to specify a reference time series. One way is to compare all individual time series to an average time series. Another way is to select one of the dimensional time series as the reference time series. Those skillful in the art will recognize that there are multiple ways to define a reference time series for comparison purposes.

Therefore, the present invention substitutes categorical variables with proximity based continuous variables which allows to reduce the number of variables for analysis, to speed up the processing and increase the accuracy of the results.

BRIEF DESCRIPTION OF THE DRAWINGS

The following drawings illustrates exemplary embodiment; however, they are helpful in illustrating objects, features and advantages of the present invention because the present invention will be more apparent from the following detailed description taken in conjunction with accompanying drawings in which:

FIG. 2A is a schematic diagram illustrating one embodiment of a data set.

FIG. 2B is a schematic block diagram illustrating one embodiment of a data set and the associated metadata.

DETAILED DESCRIPTION OF THE INVENTION

Figure 1:
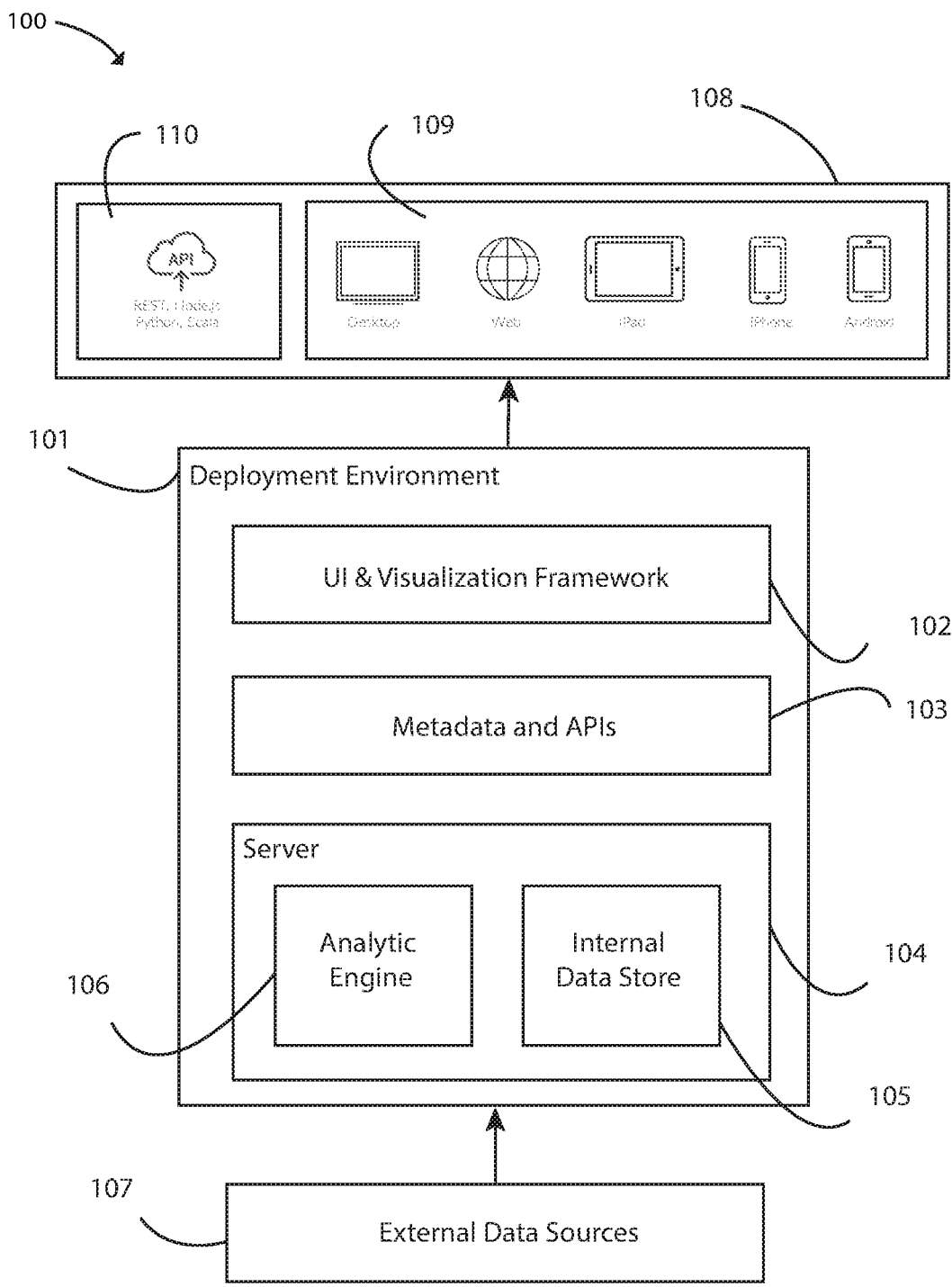
FIG. 1 is a schematic block diagram illustrating one embodiment of a data processing system.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing program code. The storage devices may be tangible, non-transitory, and/or non-transmission.

Many of the functional units described in this specification have been labeled as modules, in order to more particularly emphasize their implementation independence. For example, a module may be implemented as a hardware circuit comprising semi-conductors such as logic chips, transistors, or other discrete components. A module may also be implemented in programmable hardware devices such as field programmable gate arrays, programmable array logic, programmable logic devices or the like.

Modules may also be implemented in program code and/or software for execution by various types of processors. An identified module of program code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable medium.

The computer readable medium may be a computer readable storage device. The computer readable storage medium may be a storage device storing the program code. The storage device may be, for example, but not limited to, an electronic, magnetic, optical, electromagnetic, infrared, holographic, micromechanical, or semiconductor system, apparatus, or device, or any suitable combination of the foregoing.

Program code for carrying out operations for embodiments may be written in any combination of one or more programming languages, including an object oriented programing language such as Java, C or the like, query languages such as SQL or Non-SQL languages, and scripting languages such as Python, JavaScript or similar programming languages. The program code may execute entirely on a user's computer, partly on the user's computer, as a stand-alone software package, partly on the user's computer and partly on a remote computer or entirely on the remote computer or server.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by program code. These program code may be provided to a processor of a general purpose computer, special purpose computer, or other programmable data processing apparatus to produce a machine, such that the instructions, which execute via the processor of the computer or other programable data processing apparatus, create means for implementing the functions/acts specified in the schematic flowchart diagrams and/or schematic block diagrams block or blocks.

The program code may also be stored in a storage device that can direct an apparatus, a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

FIG. 1. is a schematic block diagram illustrating one embodiment of a data processing system 100 comprises: 101 shows the deployment environment within which the system components are installed. The deployment environment can be a cloud infrastructure such as AWS (Amazon Web Services), Microsoft Azure, Oracle Cloud, or any other public or private cloud environment. The deployment environment can also be an on-premise enterprise software infrastructure or a personal computer. 102 is the UI and Visualization framework that renders the data allows users to interact with the data and the results from the data processing and analysis. 103 is the metadata and API layer used for: (1) configuring the input parameters, (2) governing the communication between the UI/UX framework 102 and the server 104, and (3) granting access of external systems to the platform resources via API calls 110. The server component 104 comprises of an analytic engine 106 that processes queries, performs data transformations, machine model and predictions generation. The server component 104 further comprises of an internal data store 105 where individual data files are stored. Data is ingested into the internal data store 105 from external data sources 107 and is stored into files. The server 104 can perform various operations on the internal data store 105 such as configure import and streaming connections, append new data to existing files, delete files, create new columns within existing files, and many more which will be obvious to those skillful in the art. 108 is the presentation layer where the UI and the visualizations are rendered. 109 is the device accessible presentation layer which included computer screens, terminals, mobile and other commonly user devices. A user can access the platform on any of these devices via a web browser. 110 is the API access which allows to call the apparatus and use its functions from with third party applications. In this way the entire apparatus or parts of its functions can be embedded in other applications.

FIG. 2A is a schematic diagram illustrating one embodiment of a data set 200a. A data set typically has a header row 201 which indicates the titles 202 of the columns in it. However, it is not unusual the header row 201 to be contained in a separate file or not to be included if the columns are known to the user. Below the header row 201 are the data records rows 203. A data set can contain any number of rows. The data sets are stored in the data store module 105 on FIG. 1.

FIG. 2B is a schematic block diagram illustrating one embodiment of a data set 200b along with the associated metadata. The data set is the same that is shown in FIG. 2A. Metadata provides useful descriptions of the data set that are leveraged by the metadata layer 103 in FIG. 1. 201 shows the same header row as in FIG. 2A and 203 shows the same data records rows as in FIG. 2A. 204 shows the different data types such as time stamps 205 for date and time records, numbers 206A also referred to as numeric fields 206B, and nominal data 207 which contains attribute data. In this particular data example the attributes are "Cats", "Dogs" and "Fish" the attributes describe some measures, as for example "Sales". Attributes can come as strings or numbers, and in both cases they are treated as categorical variables and, thus, require encoding for machine processing. 208 shows a sequence data which reflects the order of the data records. Sequences can be generated for the entire data set or within attributes. In this example, we have separate sequences for each of the three attributes.

Figure 3:
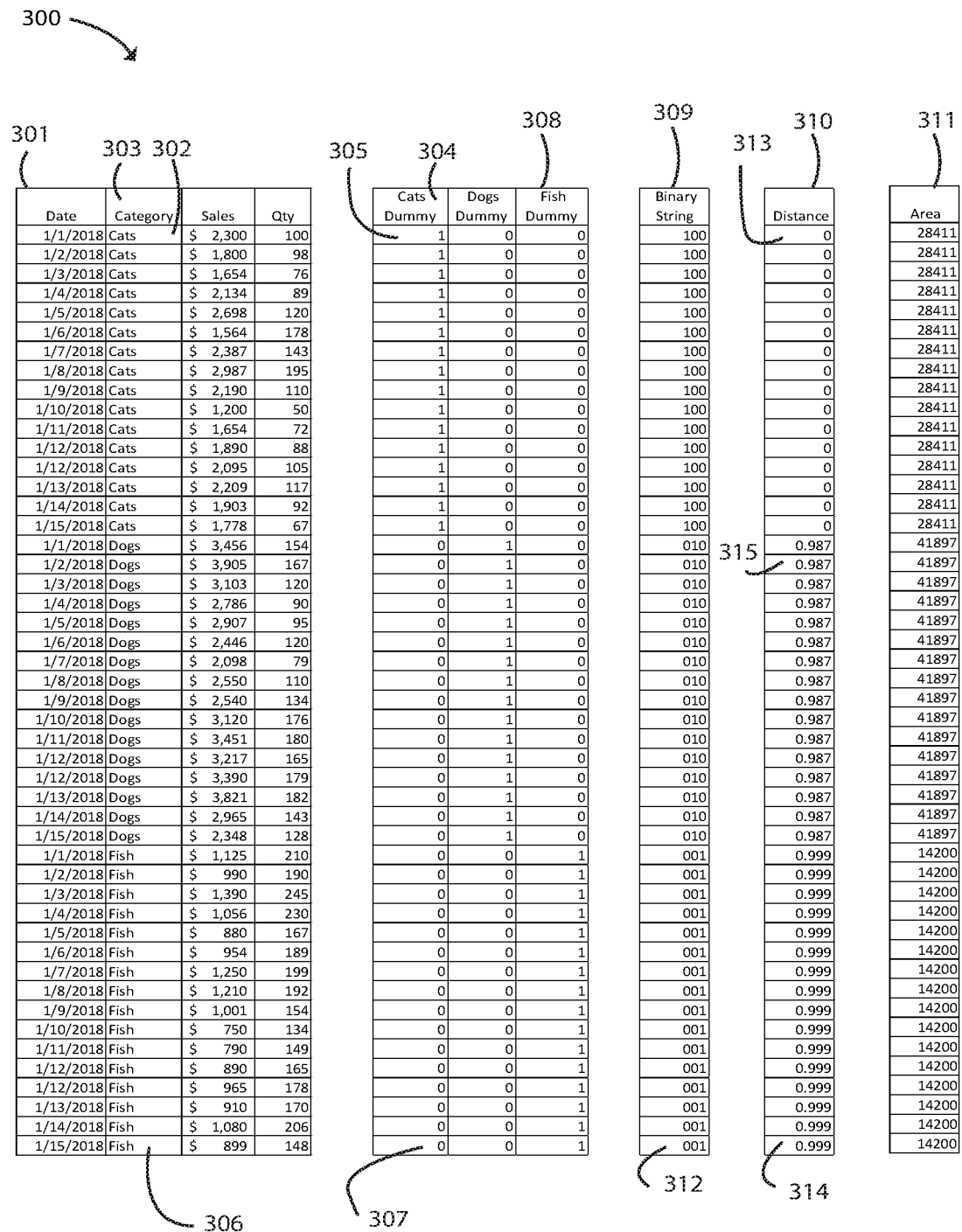
FIG. 3 is a schematic diagram illustrating different encoding methods.

FIG. 3 is a schematic diagram illustrating different encoding methods 300. 301 illustrates one type of a data set that is ingested in the system. It has the same layout as the data set shown on FIG. 2A. 308, 309. 310 and 311 represent different encoding methods for the category column 303. 308 illustrates the method of dummy variable encoding. Under this method a separate column is being created for each attribute in the categorical column 303. Categorical column 303 contains three attributes, hence method 308 adds three new columns to the data set. 304 is the dummy column for the "Cats" category. It contains a numeric value of "1" (305) for each row in 301 that contains attribute value "Cats" (302), and "0" (307) if the attribute value is different (306). This method of encoding is not optimal for machine processing. 309 is a binary string or vector encoding. As it can be seen from 312 its value is a simple concatenation of all dummy variables in 308. This method is also not efficient for processing. 310 and 311 represent the time-series based encodings that convert the categorical variable 303 into a continuous variable. 310 represents distance encoding. The numbers within column 310 represent a measurement of how similar or dissimilar the different attribute time series are. In this case, the "Cats" time series is the baseline against which all other time series are compared and hence its number is "0" (313). 314 and 315 represent the similarity scores for "Fish" and "Dogs" respectively. It is obvious that the time series pattern for "Fish" is closer to "Cats" with a similarity score of 0.999, that that of "Dogs" which similarity score is 0.987. The distance scores can have different magnitude and also can be expressed as percent difference, or in many other ways to convey the information to the user. What is important with this encoding is that the similarity of the time series reflect true similarities between categories. For example, we can say that "Cats" and "Fish" products have very similar sales patterns. 311 represents an area encoding which also transforms the categorical variable 303 into a continuous numeric variable. The numbers in column 311 measure the area underneath the time series.

Figure 4:
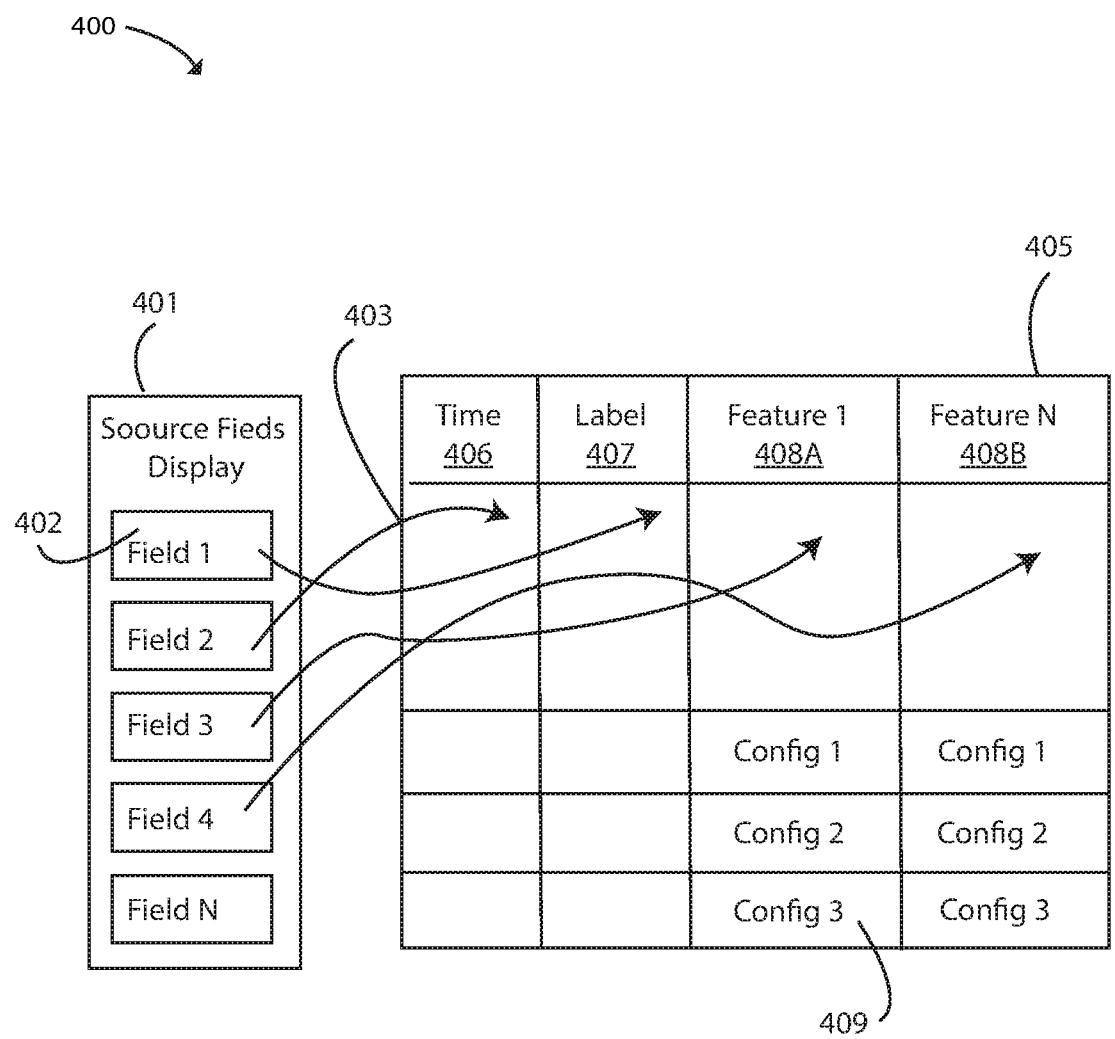
FIG. 4 is a schematic block diagram illustrating one embodiment of data mapping and configuration for modeling.

FIG. 4 is a schematic block diagram illustrating one embodiment of data mapping and configuration 400 for modeling. 401 illustrates the fields (columns) 402 from the source file shown in FIG. 2A. 405 is a mapping and configuration module for the inputs into the analytical model. The input fields 402 are assigned different roles in the analytical model such as time (406), label (407) and features (408A and 408B). The roles in the analytical model may have different labels, such as dependent and independent variables, inputs, etc. There may be any number of inputs into the same role depending on the analytical model that will be estimated. The input fields are mapped onto the mapping and configuration module 405 via a process 403 that can be realized through GUI or programmatically via API calls. Each input into the model can be further configured, transformed or modified via internal processes (409). The present encoding method is implemented via such configuration 409.

Figure 5:
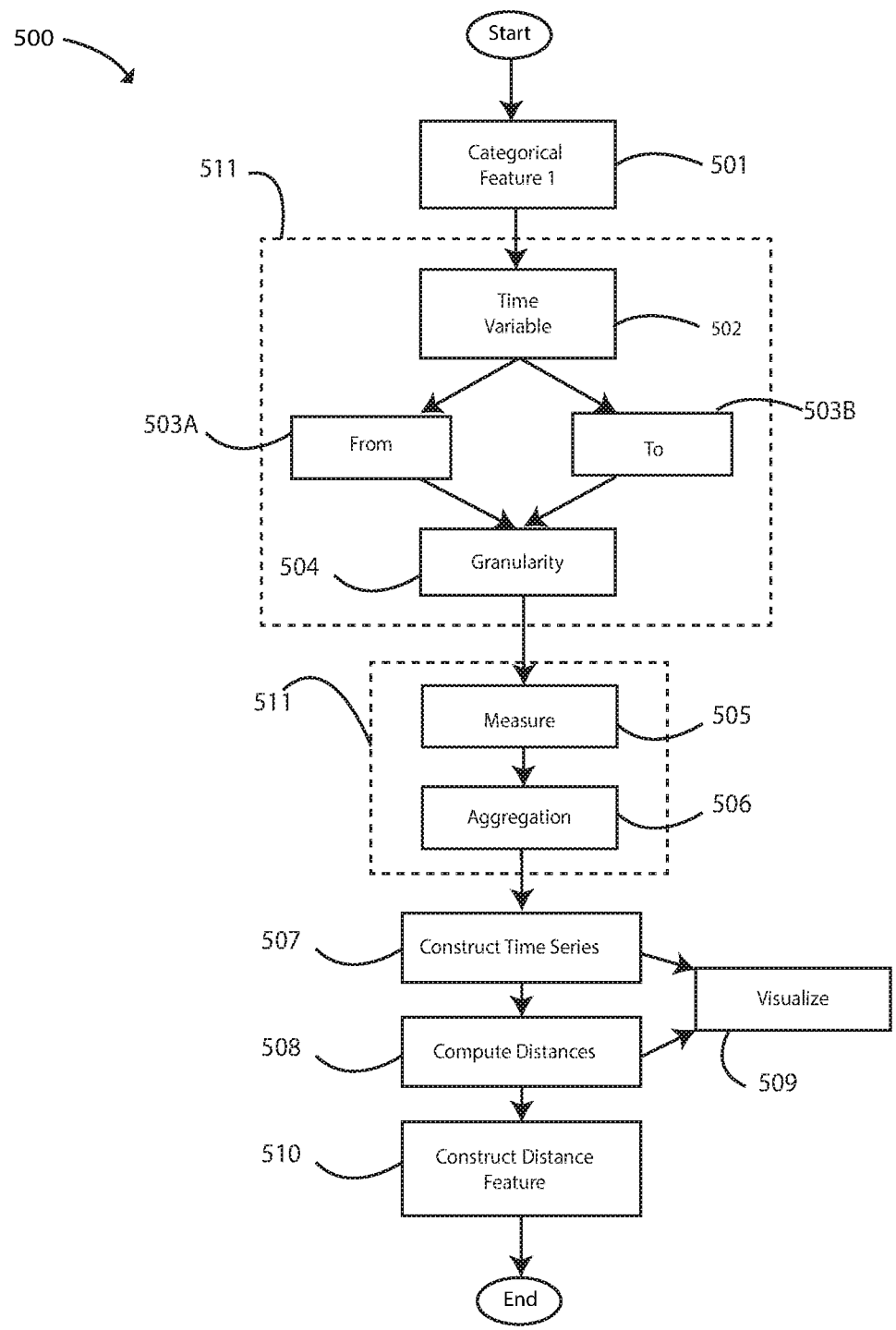
FIG. 5 is a schematic flow chart illustrating one embodiment of the data encoding method.

FIG. 5 is a schematic flow chart illustrating one embodiment of the data encoding method 500. 501 is one categorical feature selected from the mapping and configuration module 405 shown on FIG. 4. The user has also selected a time-series based categorical encoding configuration using the internal process 409 from FIG. 4. Next the user will define the parameters for the time series encoding. 511 indicates that multiple steps are required to configure a particular parameter. 501 is the selection of time variable to be used to construct the time series. 503A and 503B define the range of the time series that will be constructed. For example the data set may contain five years of data. Yet, for the encoding purpose, the user may need just the last year of data. 504 defines the granularity for the time series, i.e., the time series for the last year of data may be constructed on a monthly, weekly, daily, or hourly basis. The granularity of the data depends on how it is collected. Some data is very granular containing records for milliseconds. 505 is the selected measure from the data set for the construction of the time series. The selected measure may or may not be included as an input in the analytical model. 506 sets the aggregation function for the measure 505. All levels of granularity above the lowest require aggregation function as the data points within the higher data level have to be summarized into a single point to be displayed on the chart. 507 executes the query to generate the time series. The number of time series depends on the number of attributes within the categorical feature 501. The query can be constructed using a GUI, code or API and is executed in the language of the data store. 508 computes the comparison measures between the time series. Different types of comparison measures can be computed and users can add custom algorithms to compute particular comparisons. The results from 507 and 508 can be visualized via the visualization framework 509, also shown on FIG. 1 102. 510 constructs the time series based encoded feature as a new model input.

Figure 6A:
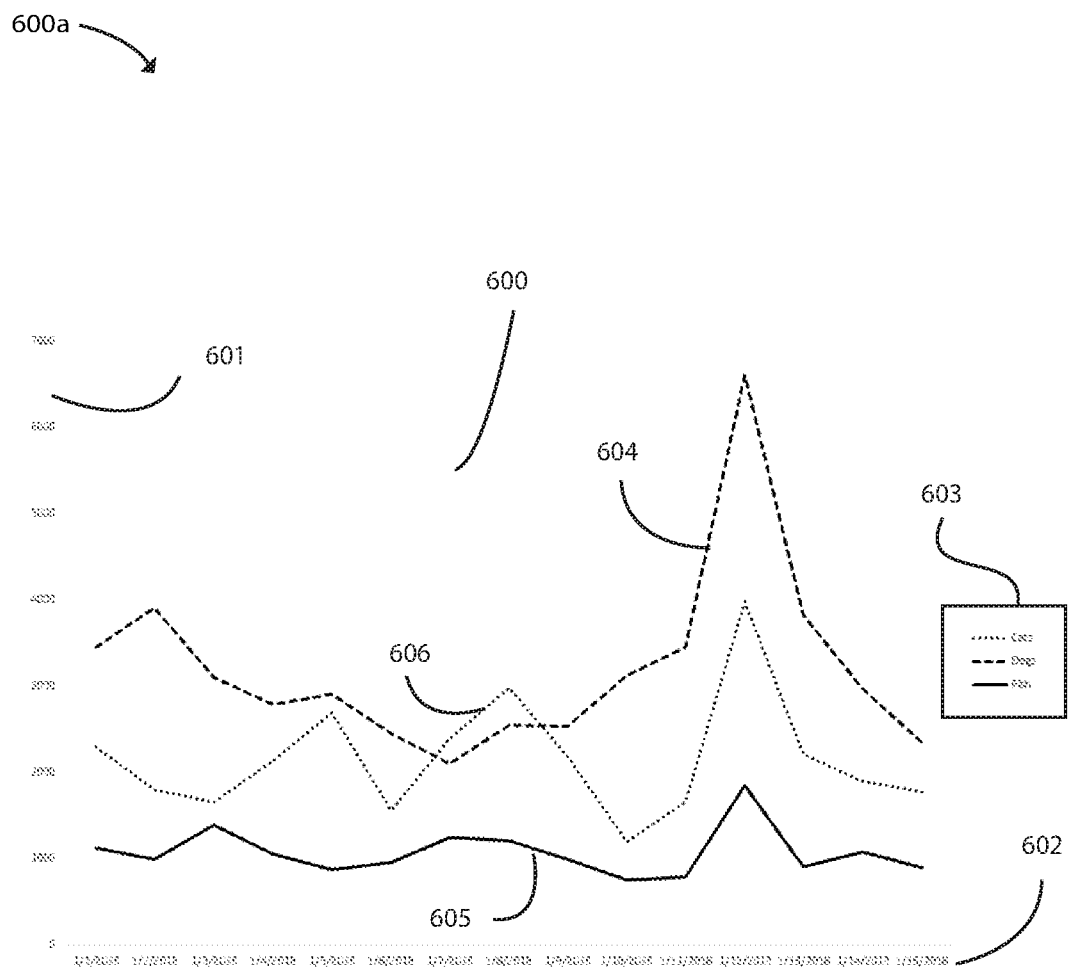
FIG. 6A is an illustration of one embodiment of distances between time series.

FIG. 6A is an illustration of one embodiment of distances between time series 600*a*. 600 is a graph rendering of the constructed time series and the comparison is made based on the similarities of the shapes of the time series. The similarities between the shapes of the time series can be evaluated using mathematical algorithms such as Manhattan, Euclidian, Pearson and other distance estimation algorithms. Custom algorithms can be added by the users. 601 is the Y axis associated with the selected measure for the construction of the time series. 602 is the X axis associated with the time range selected for the construction of the time series. 603 is the legend showing which time series correspond to which attribute within the categorical feature that is being encoded. 604 is the time series for the attribute "Cats" in the example data set from FIG. 2A; 605 is the time series for "Fish" and 606 is for "Dogs". The time series are rendered as lines. As it can be seen, time series 605 has a closer shape to time series 604 than time series 606. This obvious similarity is reflected in the distance scores shown in FIG. 3 310.

Figure 6B:
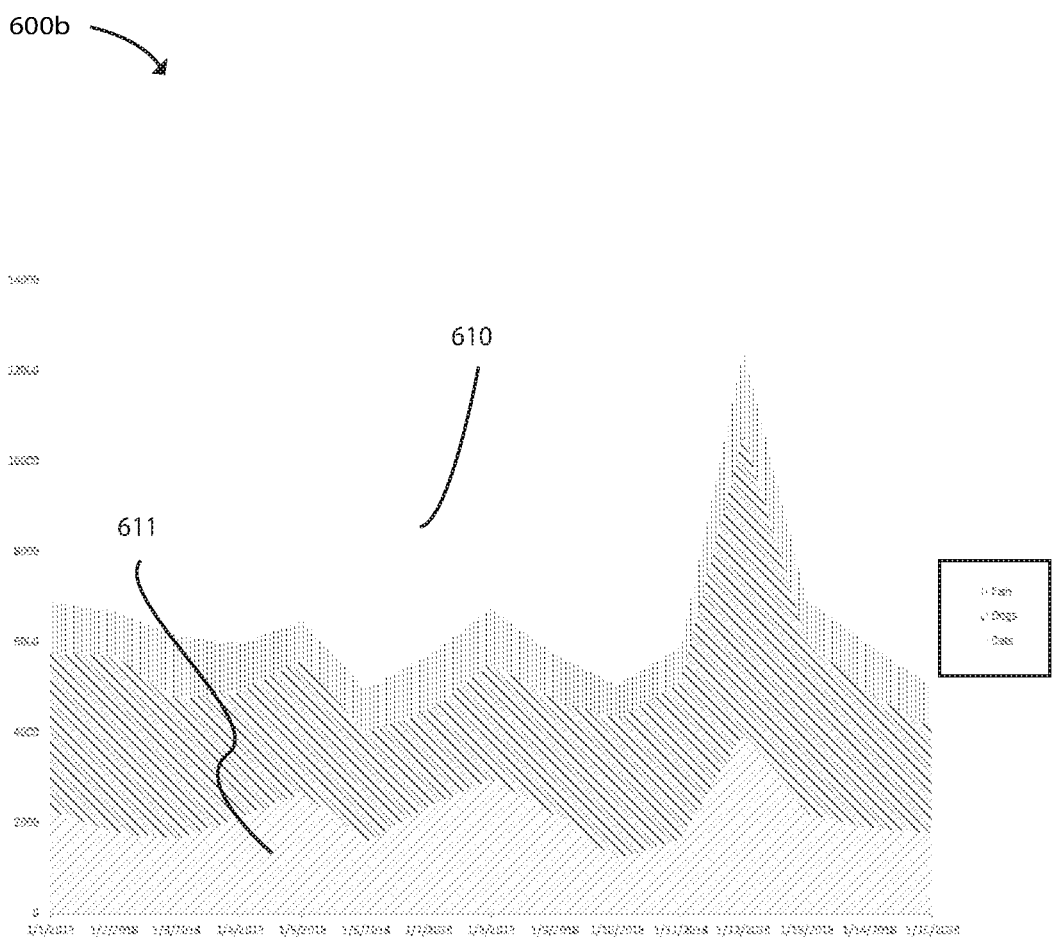
FIG. 6B is an illustration of one embodiment of area differences between time series.

FIG. 6B is an illustration of one embodiment of area differences between time series 600*b*. 610 is a graphical representation of the area differences between the constructed time series. It uses the same measure, time range and attributes as in graph 600 on FIG. 6A but the comparison metric is the value of the area underneath the line as shown in 611. Different methods and algorithms can be used to estimate the area underneath the chart. A graphical representation of the time series is not required during the execution of the analytical models. However, many users may want to visualize the differences in order to fine tune the parameters.

Figure 7:
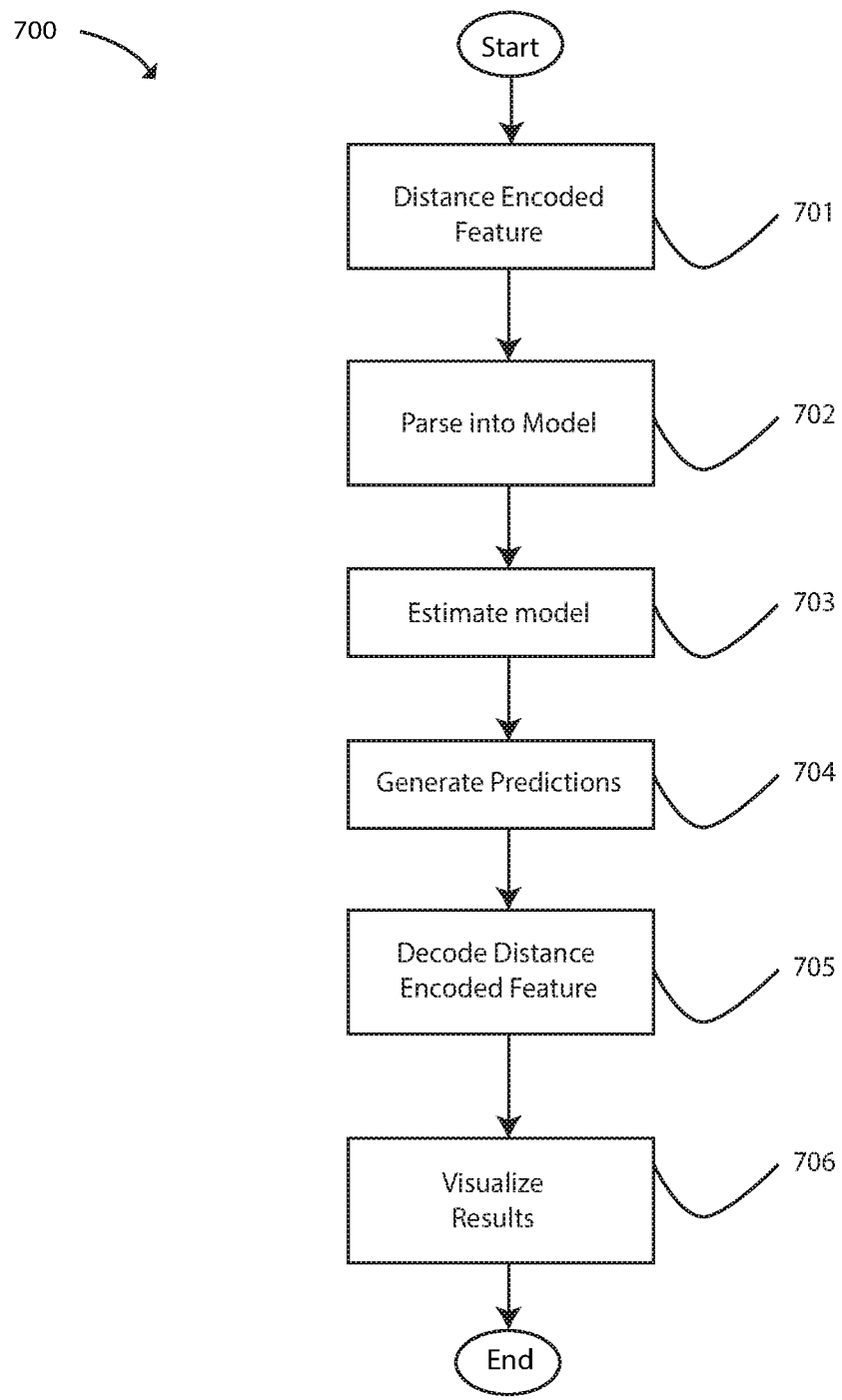
FIG. 7 is a flow chart of one embodiment of a decoding method.

FIG. 7 is a flow chart of one embodiment of a decoding method 700. 701 shows the distance encoded feature. Step 702 parses the new feature as an input into the analytical model. The distance encoded feature 701 is used instead of the original categorical feature in the analytical model. 703 executes the analytical model. 704 generates sequence predictions based on the executed model. 705 is a process that takes the predicted sequences for the distance encoded feature 701 and decodes them to be mapped to the categorical attributes. The predicted sequences may not match exactly the original comparison numbers in which case they are rounded to the nearest neighbor score. Many different methods exist to round a metric to its nearest neighbor. 706 renders interactive visualizations of the model results (predictions) with the decoded values for end users to understand and/or further analyze.

Figure 8:
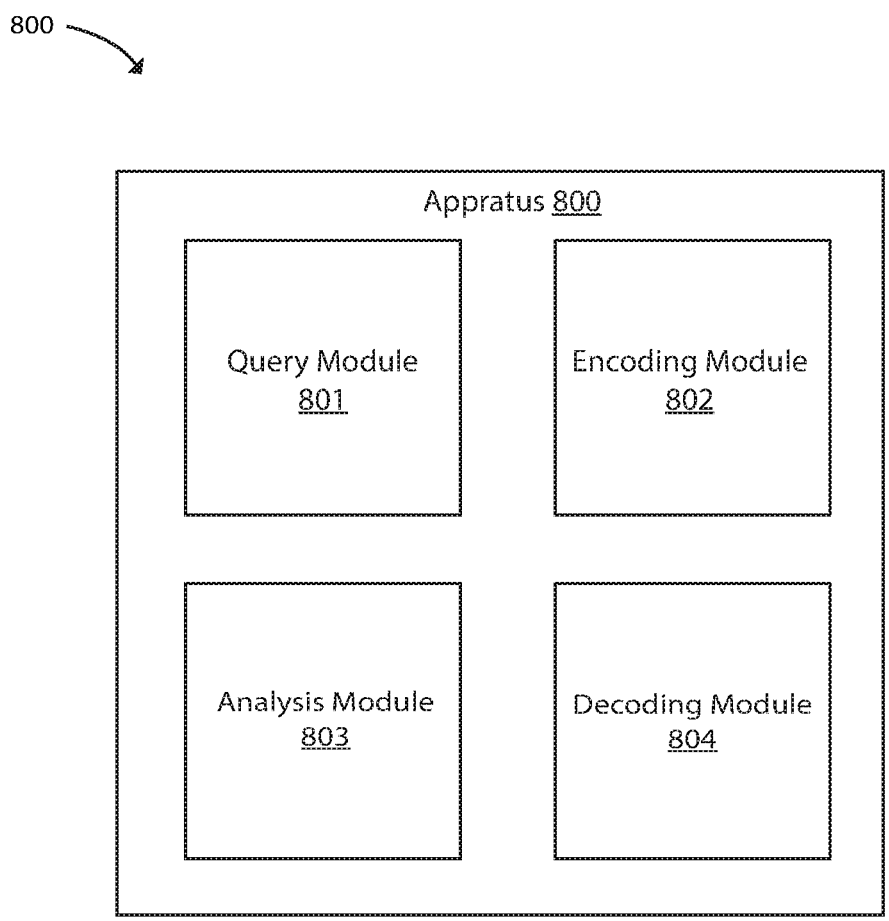
FIG. 8 is a schematic block diagram of one embodiment of the apparatus encoding nominal or ordinal to continuous variables.

FIG. 8 is a schematic block diagram of one embodiment of the apparatus 800 encoding nominal and ordinal to continuous variables. The apparatus may be embodied on a server or a computer and deployed in many environments. The apparatus includes a query generation and execution module 801 to construct the time series from the input data sets. 802 is the encoding module generating the comparison scores and the encoded new feature. 803 is the analytical module that generates the model and the predictions with the encoded inputs. 804 is the decoding module which that decodes the predicted values from the encoded features and maps them to the original attributes in the categorical feature.

Figure 9:
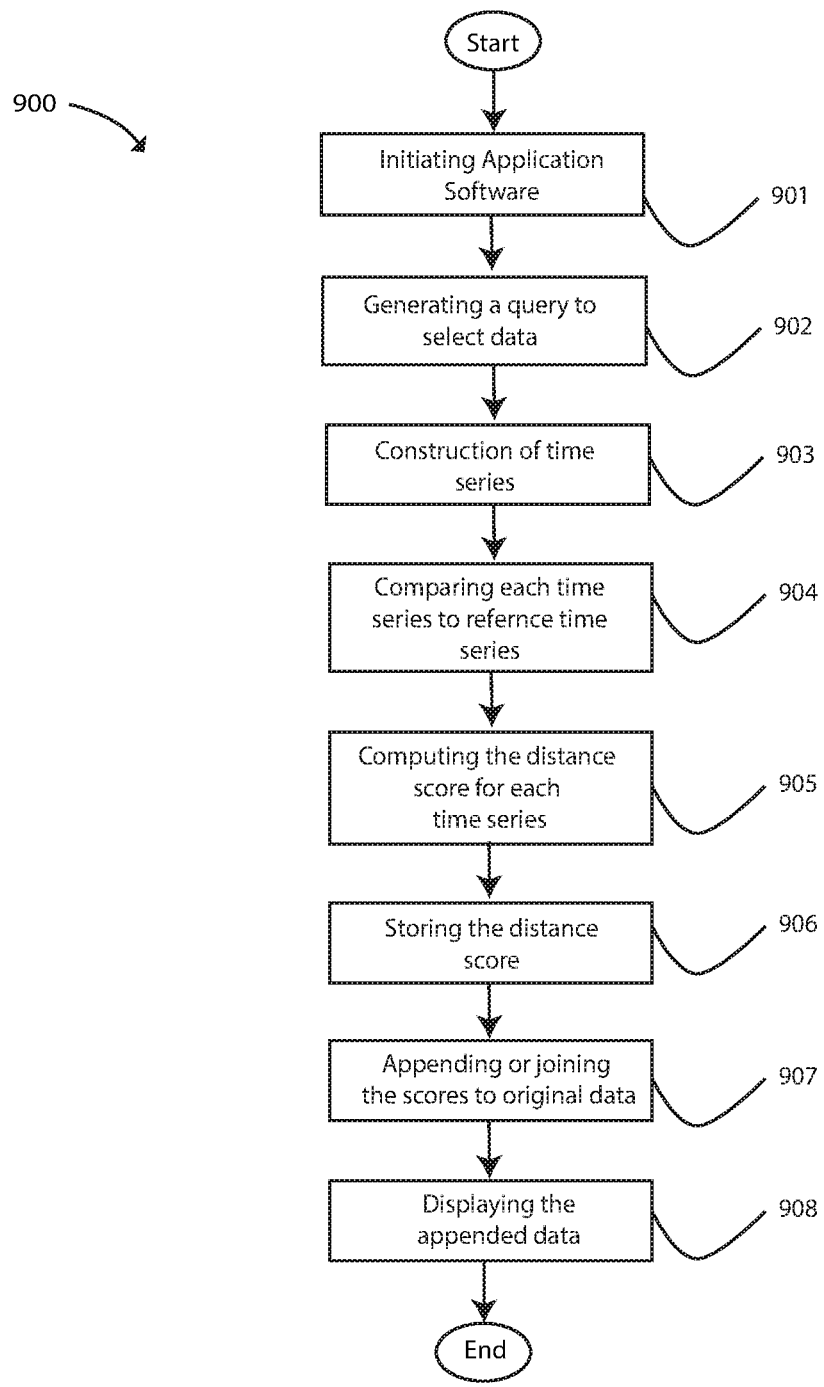
FIG. 9 is a flow chart of one embodiment of execution of specified encoding method.

FIG. 9 is a flow chart of one embodiment of a method and system 900 that executes automatically the specified encoding on the back end server. The execution takes place with executing an application software and several steps: (1) generating a query 902 to select and aggregate the data for the construction of the time series 903; (2) comparing 904 each time series to the reference time series and computing the distance score for each time series 905; (3) storing the distance scores 906 temporarily in memory or in a file on the backend; (4) appending or joining the scores 907 as new physical or virtual column to the original data set and ensuring 1 to 1 correspondence between the original categorical values and the new distance scores numeric values; (5) adding and displaying the new physical or virtual column in the common metadata 908.

In other embodiment, the method and system provides a GUI to display graphically the time series for comparison purposes. In the graphical user interface the user can explore how different distance algorithms affect the distance scores, and then decide which one to use for the encoding.

In another embodiment, the method and system provides means to pass only the new encoded variable as a feature to the analytical or learning algorithm. The learning algorithm returns estimates/coefficients or predictions based on the numeric values in the encoded variable.

In yet another embodiment, the method and system provides means to decode the distance scores and display the modeling results to the end users where each categorical value is associated with the estimated values for the distance scores.

In yet another embodiment, the method and system provides means to use the distance scores coefficients and values for prediction purposes. The user can specify to make a prediction for some future period. The back end automatically uses the distance score for calculating the marginal impact of the categorical variable values to the overall predicted value. The predicted results are automatically associated with the original categorical dimensions and displayed in the GUI for users to interact with the predicted data.

While the invention has been described in detail with specific reference to preferred embodiments thereof, it is understood that variations and modifications thereof may be made without departing from the true spirit and scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims. The modifications include any relevant combination of the disclosed features.

We claim:

1. A method for time-series based encoding of categorical data as continuous data by a system comprising a server for data processing and analysis and an apparatus, wherein the apparatus comprises a non-transitory memory for storing program code executable by a processor, an Application Programming Interface (API) for external access to one or more resources and functions and a presentation framework for visualizing data and interacting with the data to generate tasks and actions on the server, the method comprising:
ingesting data for machine modeling;
defining one or more input fields for the machine modeling;
selecting an input field from one or more input fields, containing categorical data for encoding;
generating one or more time series values for one or more attributes in the selected input field containing the categorical data;
generating values of a comparison metric between the one or more time series values;
constructing one or more encoded input fields, containing the values of the comparison metric;
computing the machine modeling, using the one or more encoded input fields instead of the input fields containing the categorical data; and
decoding one or more model results for the one or more encoded input fields,
wherein the method encodes one or more categorical variables into one or more continuous variables based on a time series query,
wherein the time series values are generated using a query language as a result of query execution by the program code stored on the non-transitory memory,
wherein the method further comprises configuration parameters for time series generation query and wherein the configuration parameters for the time series based encoding are applied to one or more groups of the categorical input fields.

2. The method of claim 1, wherein the categorical input fields include nominal, ordinal, or numeric data. types.

3. The method of claim 1, wherein one or more categorical fields of the categorical input fields can be selected for time series based encoding.

4. The method of claim 1, wherein different types of time series based encoding parameters are applied to different categorical input fields.

5. The method of claim 1, wherein the comparison metric measures the similarity of the shapes of the time series.

6. The method of claim 1, wherein the comparison metric measures area under the time series.

7. The method of claim 1, wherein different calculations for the comparison metric can be defined and applied by a user.

8. The method of claim 1, further comprises visualizing the time series.

9. The method of claim 1, wherein the machine modeling generates results for the one or more encoded input fields.

10. The method of claim 1 wherein, the metric for the one or more encoded input fields is decoded by matching to the nearest encoded input field.

11. The method of claim 10 wherein, the matching is performed by an algorithm which can be defined by a user.

12. The method of claim 11 wherein, the decoded input fields are mapped to the categorical input fields.

13. A system for time-series based encoding of categorical data as continuous data comprising:
a server for data processing, analysis and storing files at a file storage; and
an apparatus comprising:
a non-transitory memory for storing program code executable by a processor, the program code further comprises of metadata for input definitions. governance of user interactions and query execution;
an Application Programming Interface (API) for external access to one or more resources and functions; and
a presentation framework for visualizing data and interacting with the data to generate tasks and actions on the server;
wherein the server further comprises:
ingesting data for machine modeling;
defining one or more input fields for the machine modeling;
selecting an input field from one or more input fields, containing categorical data for encoding;
generating one or more time series values for one or more attributes in the selected input field containing the categorical data;
generating values of a comparison metric between the one or more time series values;
constructing one or more encoded input fields, containing the values of the comparison metric;
computing the machine modeling, using the one or more encoded input fields instead of the input fields containing the categorical data; and
decoding one or more model results for the one or more encoded input fields,
wherein the server encodes one or more categorical variables into one or more continuous variables based on a time series query,
wherein time series values are generated using a query language as a result of query execution by the program code stored on the non-transitory memory,
wherein the server further comprises configuration parameters for time series generation query and wherein the configuration parameters for the time series based encoding are applied to one or more groups of categorical input fields.

14. The system of claim 13, wherein the server encoding categorical variables into continuous variables based on the time series query is performed by an algorithm which can be defined by a user.

15. A program product for time-series based encoding of categorical data as continuous data comprising a non-transitory computer readable storage medium storing program code executable by a processor to perform:
ingesting data for machine modeling;
defining one or more input fields for the machine modeling;
selecting an input field from one or more input fields, containing categorical data for encoding;
generating one or more time series values for one or more attributes in the selected input field containing the categorical data;
generating values of a comparison metric between the one or more time series values;
constructing one or more encoded input fields, containing the values of the comparison metric;
computing the machine modeling, using the one or more encoded input fields instead of the input fields containing the categorical data; and
decoding one or more model results for the one or more encoded input fields, wherein the program product encodes one or more categorical variables into one or more continuous variables based on a time series query, wherein time series values are generated using a query language as a result of query execution by the program code stored on the non-transitory memory, wherein the program product comprises configuration parameters for time series generation query and wherein the configuration parameters for the time series based encoding are applied to one or more groups of the categorical input fields.

* * * * *